United States Patent [19]

Johnson et al.

[11] Patent Number: 4,794,022
[45] Date of Patent: Dec. 27, 1988

[54] STABLE BEDDING METHOD AND APPARATUS

[75] Inventors: Roland R. Johnson; Richard R. Napier, both of Fort Worth, Tex.

[73] Assignee: Frank Paxton Lumber Company, Fort Worth, Tex.

[21] Appl. No.: 60,353

[22] Filed: Jun. 10, 1987

[51] Int. Cl.⁴ .................... B05D 7/00; B05B 17/00; A01K 45/00; C09K 3/22
[52] U.S. Cl. .................................. 427/212; 118/303; 119/1; 252/88
[58] Field of Search ............. 119/1; 252/88; 427/212; 118/303

[56] References Cited

U.S. PATENT DOCUMENTS

| 891,525 | 6/1907 | Cave. | |
| 906,041 | 12/1908 | Severns. | |
| 944,276 | 12/1909 | Punch et al. | |
| 958,007 | 5/1910 | Porteus. | |
| 2,692,861 | 10/1954 | Weeks et al. | 252/88 |
| 3,059,615 | 10/1962 | Kuceski | 119/1 |
| 3,533,953 | 10/1970 | Mills et al. | 252/88 |
| 3,921,581 | 11/1975 | Brewer | 119/1 |
| 4,208,433 | 6/1980 | Barham Jr. et al. | 426/69 |
| 4,258,659 | 3/1981 | Rowell | 119/1 |
| 4,378,756 | 4/1983 | Whiteman | 119/1 |
| 4,471,717 | 9/1984 | Lander | 119/1 |
| 4,519,340 | 5/1985 | Dickey | 119/1 |
| 4,560,527 | 12/1985 | Harke et al. | 264/500 |

Primary Examiner—Michael Lusignan
Attorney, Agent, or Firm—Robert A. Felsman

[57] ABSTRACT

This invention is an improved method of treating wood waste, the apparatus useful in treating the wood waste. Wood waste, which is a mixture of wood chips, wood shavings, and sawdust, is treated with a food grade oil. The resulting bedding is comparatively dust free, edible, and biodegradable.

8 Claims, 2 Drawing Sheets

STABLE BEDDING METHOD AND APPARATUS

BACKGROUND OF THE INVENTION

1. Field of the Invention:

This invention relates generally to a method and apparatus for producing improved stable bedding, and specifically to a method and apparatus for treating wood waste with edible oils to render it more suitable for animal stable bedding.

2. Description of the Prior Art:

Stable bedding plays an important role in animal health, safety, and comfort. Expensive and treasured animals such as horses, dairy cows, and even zoo animals would benefit from an improved stable bedding. The discussion below is mainly directed to horse bedding, but all types of animals housed in stables experience similar benefits from these improvements.

Horses confined to a stable require bedding. A daily cleaning of the stall, and the periodic removal and disposal of the bedding is a critical task in maintaining the good health of a horse.

Most parasites that affect horses have a life cycle that begins with the infection of a horse through its feed or water. The parasites mature in the digestive tract of the horse. They produce eggs while in the horse, which pass out through the animal's feces. Most parasitic infections of horses can be attributed to the fact that, as a domestic animal, horses have been forced to sleep and eat in close proximity to their own feces.

Horses are subject to more than 150 different kinds of internal parasites throughout the world; in this country, they are subject to approximately 75 species of parasites. See generally M. E. Ensminger, *Horses and Horsemanship*, 5th edition, 1977, page 315-16. It is widely recognized that animal health is closely related to sanitary stable practices.

Stable bedding serves to absorb the moisture from animal urine and feces. The bedding can be removed periodically along with the dried feces. The bedding allows for a more rapid and thorough cleaning of the stable. Accordingly, the risks of parasitic infection are reduced through the use of stable bedding.

It is recommended that the bedding be approximately six inches deep. See Jack Coggins, *The Horseman's Bible*, 2nd edition, 1984, page 59-56. The minimum amount of bedding to be used is the amount necessary to absorb completely the liquids in the manure. This minimum amount can itself be sizable.

On average, a thousand pound horse will excrete eight tons of manure in a year. Twenty percent of a horse's excrement is in liquid form, for a yearly total of 3,200 pounds of liquid. The amount of bedding needed will, of course, depend upon the water absorption capacity of the bedding material.

Bedding materials can vary widely in their absorption capacity. For example, dry sand will absorb twenty-five pounds of water per hundredweight. Air dry long wheat straw will absorb 220 pounds per hundredweight, while chopped wheat straw will absorb 295 pounds of water per hundredweight.

Sawdust can absorb between 150 to 250 pounds per hundredweight, depending on the type of woods, either pine or hardwood. Wood chips can absorb between 150 to 300 pounds of water per hundredweight, again depending upon the types of woods. Wood shavings can absorb between 150 to 200 pounds of water per hundredweight, once again depending upon the types of woods.

Thus, for a twenty-four hour confinement, the minimum daily bedding requirements for horses, based on uncut wheat or oat straws is ten to fifteen pounds. See generally Ensminger, *Horses and Horsemanship*, 5th edition, 1977, pages 417-21.

A variety of materials can be used for stable bedding. These include straws, peanut hulls, sand, leaves, tree bark, peat moss, ground corn cobs, and wood waste which includes sawdust, wood chips, and wood shavings.

Wood shavings are usually produced when lumber is planed. They are very thin slices of wood. Sawdusts are the fine particles produced when lumber is sawed. The term "wood chips" serves to describe small pieces of wood that are neither shavings nor sawdust. The term "wood waste" serves to describe wood shavings, sawdust, and wood chips.

Of the wood waste beddings, wood shavings are preferred. In *Elements of Stable Management*, Barnes & Company, 1975, by Carol R. Melcher, sawdust is compared to wood shavings. Ms. Melcher states that sawdust is not a good bedding simply because it is too "flyaway". The sawdust will get into the horses eyes, or lungs. The inhalation of sawdust will set up an irritation in the lungs that will lead to breathing disorders later. Moreover, if the sawdust cannot be expelled through coughing, chronic lung infections may be produced.

The threat posed to a horse's health by airborne sawdust is not to be underestimated. The principal use for most horses is related to their athletic ability. Thus, physical fitness in "wind and limb" is of paramount concern. Diseases that affect the respiratory system, and interfere with the horse's wind, have potential to render an animal useless.

One commonly recognized ailment is associated with the inhalation of dust, pollen or mold spores. This is known as the "heaves". This disease resembles asthma or emphysema in humans. It is a loss of elasticity of the lungs that results from a breakdown of the walls of the lungs. The condition is characterized by an apparent extra contraction of the flank muscles during expiration.

The heaves can be caused by dusty hay, dusty atmosphere, severe exertion of an out of condition horse, or respiratory infections. It is considered to be a serious unsoundness. See generally Melvin Bradley, *Horses: A Practical and Scientific Approach*, McGraw Hill, 1981, page 132; and 1984 *Yearbook of Agriculture: Animal Health Livestock and Pets*, U.S. Department of Agriculture, 1984, pages 534-36.

In addition, it is more difficult to keep a horse clean when sawdust is used as a bedding. It has a tendency to get in the horse's coat and make it look dusty all the time, while shavings are easily shaken free from the horse's coat by its movements. See generally Melcher, *Elements of Stable Management*, chapter 3.

SUMMARY OF THE INVENTION

This invention is a method and apparatus for treating wood wastes, which are wood chips, wood shavings, and sawdust, with a food grade oil. In the wood waste so treated, the smaller particles of wood waste, such as sawdust, that can become airborne quite easily are suppressed. The food grade oil diminishes the number of these particles by urging the small particles to adhere to the larger particles.

Thus, wood waste is rendered a more suitable bedding for stables. The health risks associated with the tiny airborne particles are greatly reduced. This is accomplished without diminishing the absorption capacity of the wood waste. Wood waste so treated also remains biodegradable.

The apparatus of this invention is a completely self-enclosed system. This greatly reduces the health hazards to humans, and allows for the treatment of wood waste to remain entirely within state and federal air pollution standards and occupational health and safety standards for airborne particulate matter.

The above as well as additional objects, features, and advantages of the invention will become apparent in the following detailed description.

BRIEF DESCRIPTION OF THE DRAWING

FIG. 1 is a block diagram and schematic drawing of the apparatus used to treat wood waste and render it suitable for animal stable bedding.

FIG. 1 is divided into FIG. 1A and FIG. 1B on two sheets of drawings.

DESCRIPTION OF THE PREFERRED EMBODIMENT

Figure 1A:
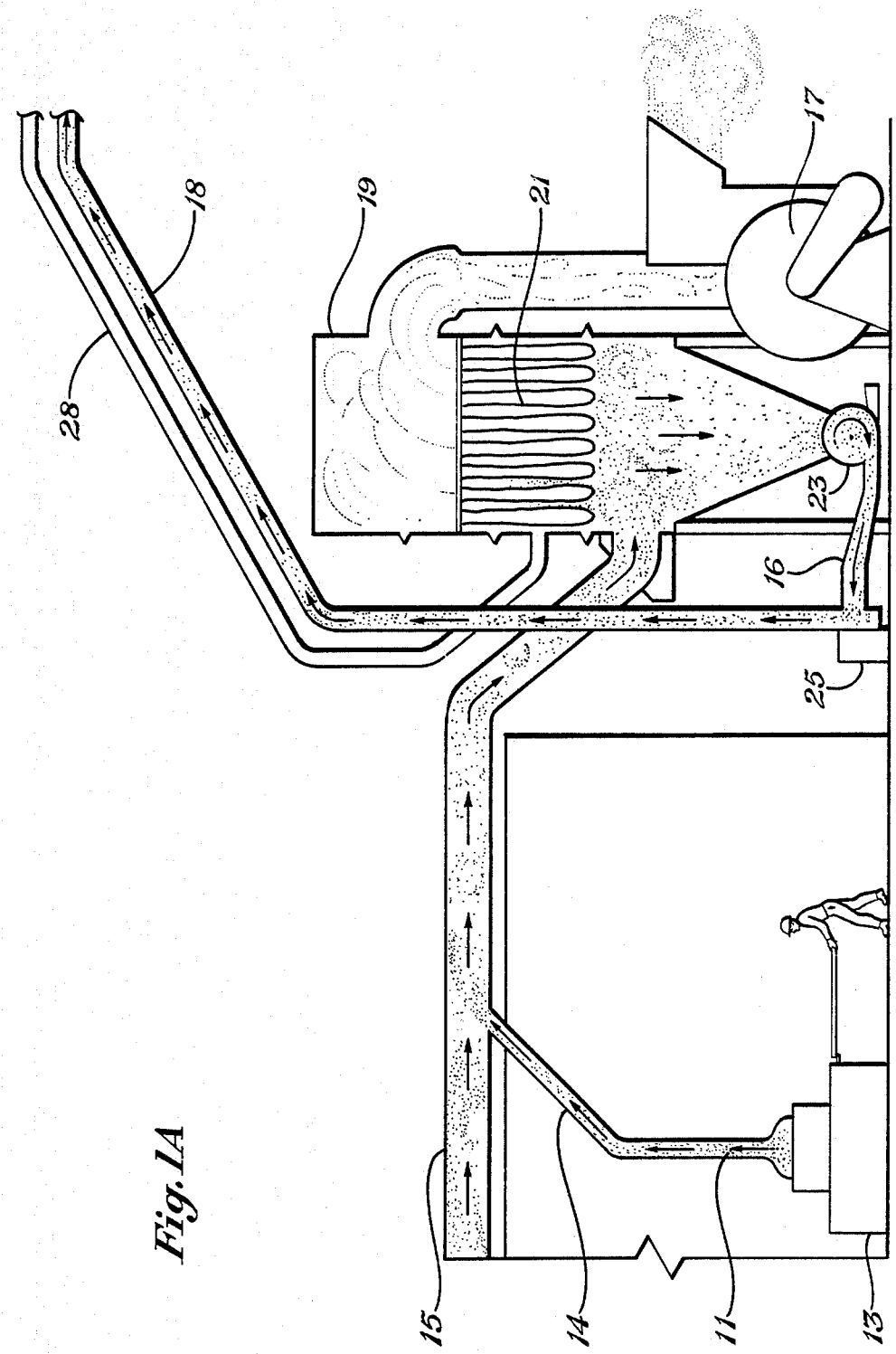
FIGS. 1A and 1B are to be viewed together.
Figure 1B:
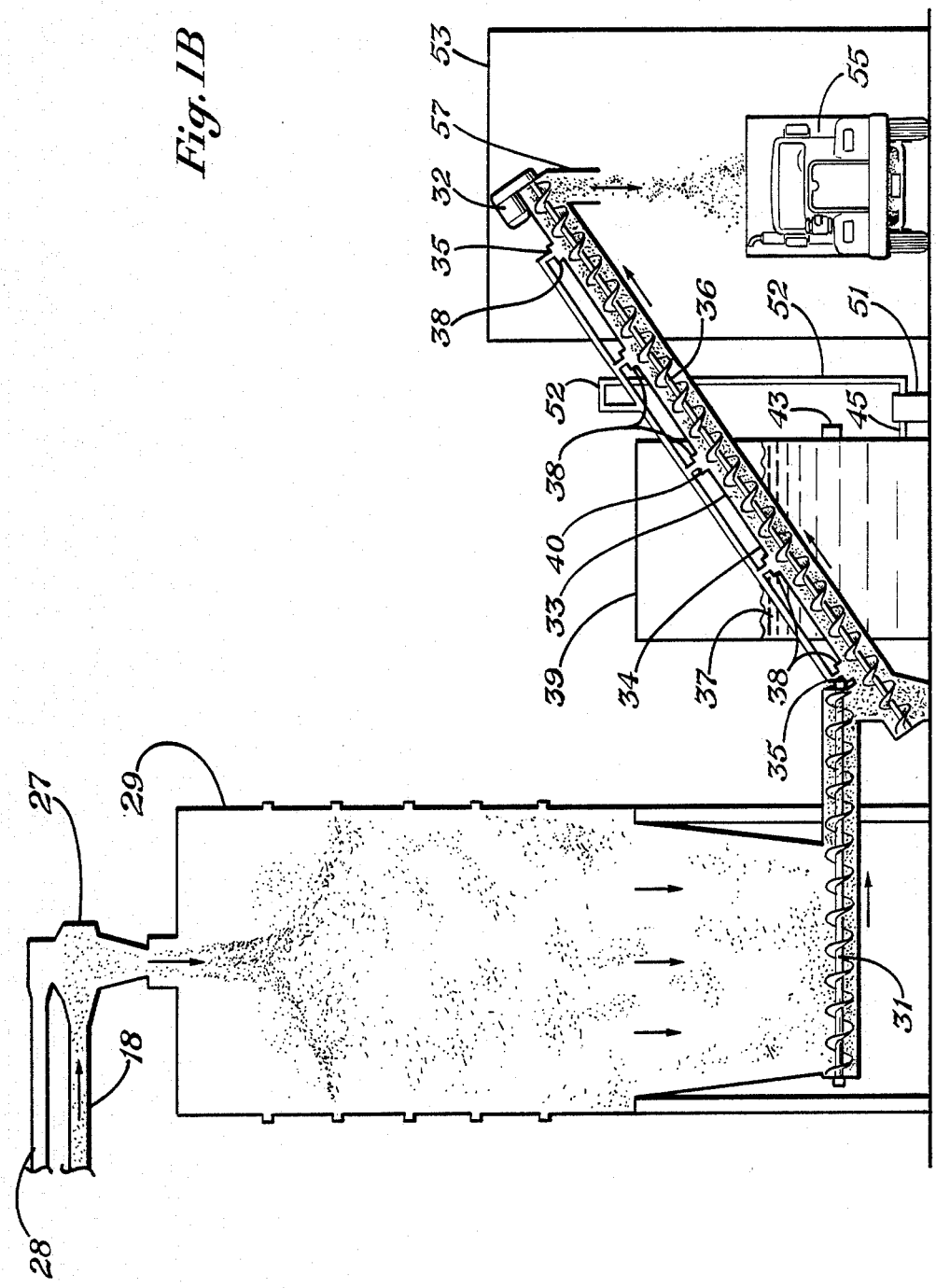

FIG. 1 depicts the apparatus used to treat wood waste with food grade oils to produce an improved stable bedding.

Wood waste 11 is created on the shop floor by wood processing machinery 13. A plurality of pipes 14 (only one such pipe is depicted) lead from the wood processing machinery 13 on the shop floor and feed into duct pipe 15. Duct pipe 15 leads to an air filter housing 19.

Connected to this housing 19 is a blower 17 that creates an air stream upon which the wood waste particles 11 are carried. In the preferred embodiment, this blower 17 has a 100 horsepower electric motor which is strong enough to pull all the wood waste 11 created on the shop floor from a plurality of wood processing machines 13.

In the preferred embodiment, blower 17 moves 29,500 cubic feet of air per minute to create a vacuum in duct pipe 15.

Within the air filter housing 19 reside a plurality of air filters 21. The air filter housing 19 and air filters 21 can be of a conventional type, such as a Carter-Day model 232 RF air filter apparatus. This particular model is employed in the preferred embodiment.

At the bottom of air filter housing 19 is a rotary valve 23. This valve opens into duct pipe 16, where a second material handling blower 25 resides. In the preferred embodiment, this second blower 25 has a 15 horsepower electric motor which is strong enough to deliver the wood waste 11 to the exhaust end of connected duct pipe 18.

The exhaust of duct pipe 18 leads to cyclone 27. Cyclone 27 is a conventional centrifugal device used for separating solid particles from the transporting air stream. Directly below cyclone 27 is storage bin 29. The wood waste 11 will fall by force of gravity into the storage bin 29.

A feedback duct pipe 28 is connected between the storage bin 29 and the air filter housing 19. Feedback duct pipe 28 directs the transporting air stream back to the air filter housing 19. Accordingly, the air stream is completely contained in the system, and no airborne dust is released into the environment.

At the bottom of storage bin 29 are two screw conveyors 31 (only one is depicted) which are powered by a small motor (not depicted). These screw conveyors feed vertical auger 33. The vertical auger 33 is of a conventional type that is useful for moving materials vertically as the auger turns.

The vertical auger has a tubular housing 34. A helical flight 36 is contained within the housing 34 and is rotated to advance the wood waste 11. Motor 32 is connected to the upper end of the helical flight 36 by a belt (not depicted). In the preferred embodiment, the motor 32 is a four horsepower electric motor.

The vertical auger's tubular housing 34 has a plurality of nozzle ports 38 machined into it. In the preferred embodiment, there are five nozzle ports 38 spaced throughout tubular housing 34. Each nozzle port 38 has a nozzle port cover 40. Mounted in each nozzle port 38 is a nozzle 35.

The food grade oil 37 is stored in an insulated tank 39. Tank 39 has a thermostat-controlled heater 43 through which the temperature of the oil 37 is controlled.

Pipe 45 leads from the tank 39 to pump 51. A filter (not depicted) resides within pipe 45 and serves to prevent the passage of particles that are suspended in the oil.

The pump 51 moves the oil forward when desired. A pipe 52 connects the pump 51 to each nozzle 35.

The vertical auger 33 leads to the top of an enclosed loading area 53. A truck 55 with trailer is parked within the enclosed area 53 while the vertical auger 33 moves the treated wood waste 11 to a port 57 near the ceiling of the enclosed area 53. The transported wood waste 11 falls from the port 57 into the truck trailer 55.

In operation, wood waste 11 produced by wood processing machinery 13 is entrained, by way of duct pipe 14, into duct pipe 15 where it is pulled along by the vacuum created by blower 17.

The air stream is directed by duct pipe 15 into filter housing 19, where air filters 21 reduce the airborne wood waste 11. This measure protects against explosions. In addition, it allows this apparatus to operate within federal and state air pollution and workplace health regulations.

The wood waste 11 falls to the bottom of air filter housing 19 by force of gravity. There, the wood waste 11 is moved by rotary valve 23 into duct pipe 16 where a second blower 25 produces another air stream. This air stream directs the wood waste 11 through duct pipe 18 to cyclone 27.

At cyclone 27, wood waste 11 is removed from the air stream, and the air is routed to the air filter housing 19 by way of feedback duct pipe 28. The wood waste 11 falls by force of gravity from cyclone 27 into storage bin 29.

Food grade oil 37 is pumped from tank 39 by pump 51, through pipe 52 to nozzles 35. The food grade oil 37 is sprayed onto the waste 11, as vertical auger 33 operates. The operation of the vertical auger 33 serves to mix the wood waste 11 as it is being sprayed by nozzles 35. Also, the treated wood waste 11 is transported to the roof of the enclosed loading area 53 where it is loaded by gravity into the trailer of truck 55.

Turning now to the method of treating wood waste with food grade oil, the various parameters that produce properly treated wood waste will be discussed.

When the wood waste is treated with food grade oils, a certain range of gallons per cubic yard must be maintained. If too little oil is sprayed onto the wood waste, it will remain dusty and a health hazard to the horse. If too much oil is sprayed onto the wood waste, it may become caked and undesirable for animal bedding. Empirical tests have determined that the ideal range of operation should be from at least 0.625 gallons of oil per cubic yard of wood waste to about 1 gallon of oil per cubic yard of wood waste.

The rate at which the oil is sprayed, and at which the wood waste is mixed will also determine the quality of the bedding produced. The wood waste should be sufficiently mixed with the oil so that airborne sawdust is uniformly suppressed. In the preferred embodiment, the vertical auger will turn the wood waste approximately one full turn as the wood waste is transported through the auger. This amount of mixing is adequate to maximize the dust suppression. In the preferred embodiment, the wood waste is transported through the vertical auger at approximately 1.25 cubic yards per minute.

The temperature of the oil determines its viscosity, and thus has bearing upon the rate of spraying and the ratio of oil to waste. Empirically it has been determined that the oil should be at least 45 degrees Fahrenheit. The ideal temperature range is thought to be between 70 to 90 degrees Fahrenheit.

While the Food and Drug Administration does not have a definition for "food grade" oil, the food industry uses six different food grade oils: cotton seed oil, soybean oil, peanut oil, corn oil, sunflower oil, and palm oil. Each oil is generally bleached, refined and deodorized.

When the food grade oil is added to the wood waste, it urges the smaller particles to adhere to the larger particles. Accordingly, these small particles such as sawdust are less likely to become airborne.

Water cannot be used to dampen the dust particles of a wood waste bedding because a damp stable bedding is undesirable. Considerable effort is expended to prevent stable bedding and animal feed from becoming damp.

A humid bedding can rot or mold easily. This is a health hazard to the horse. Moreover, the addition of water to treat wood waste would reduce the absorption capacity of the wood waste, and thus undermine the primary purpose of the stable bedding, which is to absorb moisture.

Many common chemicals are injurious to horses, and thus are not suitable for treating stable bedding. Petroleum products, phenols, and cresols are poisonous and injurious to all tissues, causing severe burns, and can be absorbed directly through the skin. See generally 1984 *Yearbook of Agriculture: Animal Health, Livestock and Pets,* U.S. Department of Agriculture, 1980, "Horse Farm Hazards" by Robert H. Singer, pages 583-89. These ordinary hazards are compounded by the fact that many horses eat their bedding. See Melcher, Supra, page 73.

Finally, it is important that stable beddings be biodegradable. This is true because such large quantities of bedding are employed, and often must be disposed on the site which is generally a farm or ranch. Important nutrients excreted by the horse can be retained by the stable bedding, which can be used to fertilize the soil.

Barnyard manure can supply valuable organic matter and plant foods to the soil. Nitrogen, Phosphorus, and potassium are the most common, but trace elements such as boron, manganese, copper and zinc are also found in manure. It is estimated that a ton of horse manure contains the plant food nutrients equal to about 100 pounds of 13-2-12 commercial fertilizer. See Ensminger, Horses and Horsemanship, p. 417-21.

Consequently, any method of treating wood waste that renders it harmful to the environment would destroy the considerable fertilizer value of the manure.

The apparatus and method disclosed in this application have a variety of advantages.

First, airborne sawdust present in the wood waste is suppressed by approximately 90 to 95 percent. The injury due to the inhalation of airborne wood waste is thus diminished. This in turn decreased the chances that the stabled animal will contract the "heaves".

In addition the chances of any eye injury or irritation caused by dust caught in the animal's eye is diminished.

Moreover, less grooming is required when a treated wood waste bedding is used than when a nontreated wood waste is used, because fewer small sawdust particles exist that can be trapped on the animal's coat.

Second, since the wood waste is treated with a food grade oil, it is safe for the animal to eat it. This is not true for many other oils or chemicals.

Third, the water absorption capacity of the treated animal bedding is not significantly impaired. This would not be true were the wood shavings treated by spraying with water.

Fourth, the addition of food grade oils to wood waste does not impair the biodegradability of discarded stable bedding. Thus, the fertilizer value of the wood waste and manure are preserved.

While the invention has been described in only one of its forms, it should be apparent to those skilled in the art that it is not so limited, but is susceptible to various changes and modifications without departing from the spirit thereof.

We claim:

1. A method of producing an improved stable bedding, the method comprising the steps of:
   providing a wood waste mixture of wood chips, wood shavings, and sawdust;
   providing a food grade oil selected from the group consisting of cotton seed oil, soybean oil, peanut oil, corn oil, sunflower oil, or palm oil;
   providing an enclosed treatment area;
   transporting the wood waste through the treatment area;
   spraying food grade oil into the wood waste while it is being transported through the treatment area; and
   mixing the wood waste while it is being transported through the treatment area.

2. A method of producing an improved stable bedding according to claim 1 wherein the ratio of oil to wood waste is at least 0.625 gallons of oil per cubic yard of wood waste.

3. A method of producing an improved stable bedding according to claim 1 wherein the food grade oil is bleached, refined, and deodorized.

4. A method of producing an improved stable bedding according to claim 1 wherein the temperature of the oil exceeds 45 degrees Fahrenheit.

5. An apparatus for treating wood waste with food grade oil to produce an improved stable bedding, comprising:
   a conduit having a supply end and an exhaust end;
   a means for entraining wood waste on a stream of air, and transporting the entrained wood waste from the supply end of the conduit to the exhaust end of the conduit;

a cyclone means connected to the exhaust end of the conduit for centrifugally separating the entrained wood waste from the transporting air stream;

a container connected to the cyclone means for receiving wood waste;

a treatment area connected to the container;

means for transporting wood waste from the container through the treatment area, and turning the wood waste while it is being transported;

a sprayer means for spraying food grade oil onto the wood waste as it is transported through the treatment area;

a tank for storing food grade oil; and means for delivering food grade oil from the tank to the sprayer means.

6. An apparatus for treating wood waste with food grade oil to produce an improved stable bedding according to claim 5, further comprising:

an air pollution control means for suppressing airborne wood waste connected in the conduit between the supply end and the exhaust end; and a feedback conduit connected between the cyclone means and the air pollution control means for routing the air stream from the cyclone means to the air pollution control means.

7. An apparatus for treating wood waste with food grade oil to produce and improved stable bedding, comprising:

a conduit having a supply end and an exhaust end;

a means for entraining wood waste on a stream of air, and transporting the entrained wood waste from the supply end of the conduit to the exhaust end of the conduit;

an air filter means connected between the supply end and the exhaust end of the conduit for suppressing airborne wood waste;

a cyclone means connected to the exhaust end of the conduit for centrifugally separating the entrained wood waste from the transporting air stream;

a feedback conduit connecting the cyclone to the air filter means for directing the air stream to the air filter means after most of the wood waste has been separated therefrom;

a container connected to the cyclone means for receiving the wood waste;

a tubular housing having a plurality of ports with port covers, connected to the container and defining a wood waste treatment area;

a helical core located within the tubular housing and rotated therein for advancing the wood waste through the tubular housing;

a plurality of nozzles secured to the tubular housing for spraying food grade oil onto the wood waste while the helical core advances the wood waste through the tubular housing;

a tank for storing the food grade oil;

a means for delivering the food grade oil from the tank to the nozzles.

8. An apparatus for treating wood waste with food grade oil to produce and improved stable bedding according to claim 7, further comprising;

a means for maintaining the food grade oil stored in the tank at a selected temperature.

* * * * *